(12) United States Patent
Shen

(10) Patent No.: US 9,274,212 B2
(45) Date of Patent: Mar. 1, 2016

(54) MOBILE TERMINAL AND PARAMETER CALIBRATION METHOD FOR GLOBAL POSITIONING SYSTEM

(75) Inventor: Shaowu Shen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 156 days.

(21) Appl. No.: 13/984,618

(22) PCT Filed: May 13, 2011

(86) PCT No.: PCT/CN2011/074060
§ 371 (c)(1),
(2), (4) Date: Aug. 9, 2013

(87) PCT Pub. No.: WO2012/126194
PCT Pub. Date: Sep. 27, 2012

(65) Prior Publication Data
US 2014/0004880 A1     Jan. 2, 2014

(30) Foreign Application Priority Data

Mar. 23, 2011 (CN) .......................... 2011 1 0071075

(51) Int. Cl.
*G01S 7/40* (2006.01)
*G01S 19/23* (2010.01)
(Continued)

(52) U.S. Cl.
CPC . *G01S 7/40* (2013.01); *G01S 19/23* (2013.01); *G01S 19/05* (2013.01); *H04W 28/18* (2013.01); *H04W 64/00* (2013.01)

(58) Field of Classification Search
CPC .......... G01S 19/05; G01S 7/40; G01S 19/23; H04W 28/18; H04W 64/00

USPC ............ 455/7, 67.11, 456.1, 424; 342/357.62
See application file for complete search history.

(56) References Cited

U.S. PATENT DOCUMENTS 6,636,744 B1 * 10/2003 Da .............................. 455/456.1
6,816,111 B2 * 11/2004 Krasner ................... 342/357.62
(Continued)

FOREIGN PATENT DOCUMENTS

CN        101257700 A     9/2008
CN        101604010 A    12/2009
(Continued)

OTHER PUBLICATIONS

International Search Report for PCT/CN2011/074060 dated Dec. 5, 2011.

*Primary Examiner* — Lester Kincaid
*Assistant Examiner* — Gary Lafontant
(74) *Attorney, Agent, or Firm* — Ling Wu; Stephen Yang; Ling and Yang Intellectual Property

(57) ABSTRACT

A mobile terminal and a global positioning system calibration method are disclosed in the invention. The mobile terminal includes: a GPS parameter calibration module (10), which is configured to calibrate GPS parameters based on at least one of the following items: data from a GPS signal feedback and collection module (20), state parameters of the mobile terminal, and environmental parameters of the mobile terminal; the GPS signal feedback and collection module (20), which is configured to acquire the GPS parameters before and after the calibration implemented by the GPS parameter calibration module (10) and feed back the collected data to the GPS parameter calibration module (10). The GPS calibration function of the mobile terminal is enhanced with the invention.

19 Claims, 3 Drawing Sheets

GPS signal feedback and collection module 20 → GPS parameter calibration module 10

(51) Int. Cl.
*H04W 28/18* (2009.01)
*H04W 64/00* (2009.01)
*G01S 19/05* (2010.01)

(56) References Cited

U.S. PATENT DOCUMENTS 6,834,180 B1 * 12/2004 Marshall ............... 455/67.11
2004/0266338 A1 * 12/2004 Rowitch ............... 455/7

2007/0008216 A1 1/2007 Ganguly et al.
2008/0150796 A1 6/2008 Syrjarinne
2010/0099434 A1 4/2010 Murayama et al.
2013/0095819 A1 * 4/2013 Cheng et al. ............... 455/424

FOREIGN PATENT DOCUMENTS

GB 2287149 A 9/1995
WO 2004055543 A1 7/2004

* cited by examiner

MOBILE TERMINAL AND PARAMETER CALIBRATION METHOD FOR GLOBAL POSITIONING SYSTEM

TECHNICAL FIELD

The invention relates to the field of communication, and more particularly, to a mobile terminal and a parameter calibration method for a global positioning system (GPS).

BACKGROUND OF THE RELATED ART

Currently, GPS is more and more widely applied in mobile terminals (also known as terminals or user terminals, such as mobile phones), and the mobile terminals have higher and higher requirements on the GPS performance. The calibration of GPS in the mobile terminals plays a very important role in improving the GPS performance. The GPS calibration methods in the related art will be described below.

In the related art, there are the following GPS calibration methods: 1. Take a small number of terminal samples to calibrate, acquire a mean value, and then write the parameter into all terminals. 2 Calibrate each terminal independently and write the respective calibration values to the respective terminals. 3. Provide an approximate Doppler frequency shift of the GPS signal through an A-GPS server, the A-GPS server has a reference GPS receiver that can calculate out the Doppler frequency shift of the satellite signal. 4. Optimize and implement with a positioning software estimation algorithm, and in the frequency shift estimation theory, most frequency estimation problems can be attributed to the problem of maximum likelihood estimation, but in many real-time applications that require rapid estimation and correction of the frequency shift, a calculation that takes a lot of time is undesirable. 5 According to the position and velocity of the satellite relative to the ground station, pre-calculate the Doppler frequency shift of the signal, based on which, correct the local oscillation frequency output by the digital frequency synthesizer in the receiver in real time, so as to achieve the purpose of eliminating the Doppler frequency shift.

All the above-mentioned methods have some disadvantages, for example, the calibration values in the method 1 are too simple and can not meet the requirements on the diversity of GPS parameters; the process of the method 2 is complicated, and the calibration process takes a a long time, which is not conducive to large-scale production in batches; and the method 3 requires the assistance of the A-GPS, which consumes terminal traffic and network resources; the software algorithm in the method 4 is complicated and is an approximation algorithm, thus its actual accuracy is not high; the method 5 needs the aid of large-scale test and pre-inference algorithm, thus it has little significance in actual application of the terminal.

SUMMARY OF THE INVENTION

The main purpose of the invention is to provide a mobile terminal and a GPS parameter calibration method to solve at least one of the above-mentioned problems.

According with one aspect of the invention, a mobile terminal is provided, comprising: a Global Positioning System (GPS) parameter calibration module, which is configured to calibrate GPS parameters according to at least one of the following items: data from a GPS signal feedback and collection module, state parameters of said mobile terminal, environmental parameters of said mobile terminal; said GPS signal feedback and collection module, which is configured to collect said GPS parameters before and after said GPS parameter calibration module performs the calibration, and feed back collected data to said GPS parameter calibration module.

Said GPS parameter calibration module comprises at least one of the following: a time delay calibration module, which is configured to calibrate time delay parameters of a GPS; a Doppler shift calibration module, which is configured to calibrate Doppler frequency parameters of said GPS; a carrier to noise ratio calibration module, which is configured to calculate and compensate for system losses of said GPS; a latitude and longitude calibration module, which is configured to calibrate pre-loaded latitude and longitude.

said latitude and longitude calibration module is configured to receive information of a current network detected by said mobile terminal or receive input latitude and longitude to acquire said pre-loaded latitude and longitude.

said time delay calibration module is configured to calculate a difference between the time of capturing satellite vehicles (referred to as SV) for a preset number of times and the required network search time, and compare said difference with a target time difference, in the case that said difference is less than said target time difference, increase a time delay value, and in the case that said difference is greater than said target time difference, decrease the time delay value; alternatively, said time delay calibration module is configured to, according to a time delay value pre-loaded by said mobile terminal, start up receiving and positioning, and after the positioning is completed, check a positioning accuracy and/or signal strength, and adjust said pre-loaded time delay according to said positioning accuracy and/or said signal strength, and start up receiving and positioning again, check said positioning accuracy and/or said signal strength, until a difference between said positioning accuracy and/or said signal strength and a target value is within a predetermined range.

Said Doppler shift calibration module is configured to detect a current clock frequency shift of a GPS receiver of said mobile terminal with a hardware clock frequency shift detector, and based on said detected clock frequency shift, correspondingly correct said clock frequency shift of said mobile terminal.

Said carrier to noise ratio calibration module is configured to calculate a difference between a first noise value obtained from the signal strength of said GPS receiver of said mobile terminal collected by said GPS signal feedback and collection module after baseband processing of said mobile terminal and a second noise value acquired from the signal strength of said GPS receiver of said mobile terminal after a GPS filter and an amplification module, and compare said difference with a pre-loaded value, and if a difference between said difference and said pre-loaded value is greater than a first threshold value, increase a system loss value of said mobile terminal, and if the difference between said difference and said pre-loaded value is smaller than a second threshold value, decrease said system loss value of said mobile terminal.

It further comprises: a control module, which is configured to, according to said state parameters of said mobile terminal and/or said environmental parameters of said mobile terminal, adjust said data from said GPS signal feedback and collection module; said GPS parameter calibration module is configured to calibrate said GPS parameters according to said data adjusted by said control module.

It further comprises: an application detection module, which is configured to detect said state parameters of said mobile terminal and/or said environmental parameters of said mobile terminal, and send said parameters to said GPS parameter calibration module; and/or, a user interaction module, which is configured to receive input state parameters of said mobile terminal and/or input environmental parameters of said mobile terminal, and send them to said GPS parameter calibration module.

Said state parameters of said mobile terminal comprise at least one of the following: current communication mode of said mobile terminal, acceleration of said mobile terminal; said environmental parameters of said mobile terminal comprise at least one of the following: environmental temperature of said mobile terminal, and latitude and longitude of a region in which the mobile terminal is located.

According to another aspect of the invention, a parameter calibration method for a global positioning system is provided for use in a mobile terminal, comprising: calibrating Global Positioning System (GPS) parameters based on at least one of the following items: data collected by said mobile terminal before and after said calibrating, state parameters of said mobile terminal, environmental parameters of said mobile terminal; acquiring GPS parameters before and after said calibrating, feeding back said collected data, and performing calibration of said GPS parameters.

Said calibrating said GPS parameters comprises at least one of the following: calibrating time delay parameters of said GPS; calibrating Doppler frequency parameters of said GPS; calculating and compensating for system losses of said GPS; and calibrating pre-loaded latitude and longitude.

Said calibrating said GPS parameters comprises: adjusting said data collected by said mobile terminal before and after said calibrating according to said state parameters and/or said environmental parameters of said mobile terminal, and calibrating said GPS parameters according to the adjusted data.

The invention addresses at least one of the problems caused by the GPS calibration methods in the related art, thereby strengthening the GPS calibration function of the mobile terminal.

BRIEF DESCRIPTION OF DRAWINGS

The drawings described herein are used to provide a further understanding of the invention and constitute part of this application, and the exemplar embodiments and the description of the invention are used to explain the invention and do not constitute a limitation to the invention. In the accompanying drawings.

PREFERRED EMBODIMENTS OF THE INVENTION

The invention will be described in detail below with reference to the accompanying drawings and the embodiments. It should be noted that, in case of no conflict, the embodiments of the present application and features of the embodiments may be combined with each other.

Figure 1:
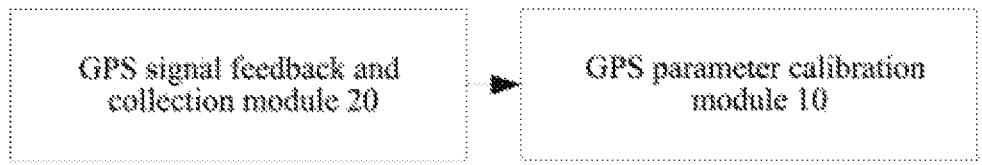
FIG. 1 is a structural diagram of a mobile terminal in accordance with an embodiment of the invention.

The following embodiments involve the design of intelligent self-calibration GPS, which ensures to the maximum extent that the GPS in the mobile terminal could work with the optimal performance at any time, and improves the positioning efficiency to the highest. The present embodiment provides a mobile terminal. FIG. 1 is a block diagram of the structure of the mobile terminal in accordance with an embodiment of the invention. As shown in FIG. 1, the mobile terminal comprises: a GPS parameter calibration module 10 and a GPS signal feedback and collection module 12. The structure will be described in the following:

the GPS parameter calibration module 10 is configured to calibrate the GPS parameters according to at least one of the following: the data from the GPS signal feedback and collection module 12, the state parameters of the mobile terminal (e.g., the current communication mode of the mobile terminal, and the acceleration of the mobile terminal), the environmental parameters of the mobile terminal (e.g. the environmental temperature of the mobile terminal, and the latitude and longitude of the region where the mobile terminal is located); the GPS signal feedback and collection module 12 is connected to the GPS parameter calibration module, and is configured to collect the GPS parameters before and after calibrating of the GPS parameter calibration module 10, and feed back the collected data to the GPS parameter calibration module 10.

The GPS parameter calibration module 10 and the GPS signal feedback and collection module 12 arranged in the mobile terminal can perform automatic GPS parameter calibration in the mobile terminal through by way of feedback, which changes the standard calibration methods that write parameters into the terminal in the related art. In addition, since the GPS parameter calibration module 10 can also calibrate the GPS parameters according to the state parameters and the environmental parameters of the mobile terminal that can affect the GPS function, the mobile terminal can be self adapted to the environment, the GPS parameters can be adjusted according to the state and the actual environment where the mobile terminal is located when the practical application scenarios of the mobile terminal change, and the influence from the outside is reduced as little as possible.

For example, in a mobile phone, the minimum C/A code signal strength of the GPS in the L1 band is −160 dBw, and compared with other RF signals in the mobile phone, this signal is very weak and is vulnerable to interference. In a real scenario, due to the difference of satellite elevation, as well as occlusion of trees, buildings, and so on, the strength of the GPS signal when reaching the ground is lower than −160 dBw, therefore, the mobile terminal integrated with the GPS function has some problems in recognizing weak GPS signals in buildings or close streets. With the abovementioned GPS parameter calibration module 10, the minimum of the C/A code signal strength can be adjusted in real time according to actual situations in order to better adapt to the environment.

The implementation method of the above-mentioned GPS parameter calibration module 10 can calibrate a variety of GPS parameters that have varying degrees of impact on the GPS function.

For example: calibrating the carrier to noise ratio. The carrier to noise ratio is the SNR per bandwidth. In the receiver, the data demodulated from the I channel can be taken as signal, and the energy of the Q channel as noise, and the mean value acquired by averaging multiple statistical values is used to estimate the carrier to noise ratio C/N0. The C/N0 is an important indicator measuring the GPS performance of a terminal. The C/N0 calibration test is used to calibrate the C/N0 evaluator of the mobile station, and the number of C/N0 calibrations is affected by software algorithms, NFs of RFs of specific mobile phones, and so on. Therefore, the noise figures NFs of different batches and board manufactures may not be the same, and if the C/N0 is too large, it will cause poor GPS receiver sensitivity, thus in the practical applications, it needs to make a compensation calibration for the C/N0, for example, the number of C/N0 calibrations can be equal to the result by subtracting the losses set in the test from the difference between the C/N0 specified by Spirent and the average C/N0 measured by the terminal in the baseband.

As another example, when mobile phones with different modes synchronize in time with different base stations, due to the errors and delay difference in the internal systems of the base stations, two systems are not accurately synchronized in time, while the GPS is time-based pseudo-range test, therefore little time differences will lead to large fluctuations in the positioning accuracy.

For another example, when there is relative movement between the GPS receiver carrier and the GPS satellite, the frequency of the GPS carrier signal received by the receiver is different from the frequency of the carrier signal transmitted by the satellite, and the frequency difference is called as a Doppler frequency shift. Due to the difference of the local oscillation frequencies of the individual VCTCXOs of the mobile phones and self-jamming, the Doppler frequency shifts GPSs are different. The GPS velocity measure is implemented by measuring the Doppler frequency shift, thus the Doppler frequency shift directly affects the velocity measure accuracy in the mobile positioning.

In the present embodiment, different modules can be used to calibrate different parameters, for example, the GPS parameter calibration module may comprise at least one of the following: a time delay calibration module, which is configured to calibrate the time delay parameters of the GPS; a Doppler shift calibration module, which is configured to calibrate the Doppler frequency parameters of the GPS; a carrier to noise ratio calibration module, which is configured to calculate and compensate for the system losses of the GPS; a latitude and longitude calibration module, which is configured to calibrate the pre-loaded latitude and longitude. As long as one of the above-mentioned modules is comprised, one of the GPS calibration parameters can be calibrated, and of course, in order to achieve better calibration, the GPS parameter calibration module may comprise three modules: the time delay calibration module, the Doppler shift calibration module, and the carrier to noise ratio calibration module, therefore, the requirements on the diversity of the GPS parameters can be met.

For example, the time delay calibration module can be configured to calculate the difference between the time of capturing SVs for a predetermined number of times and the required network search time, and compare the difference and a target time difference, and in the case that the difference is less than the target time difference, increase the time delay value, and in the case that the difference is larger than the target time difference, decrease the time delay value; alternatively, the time delay calibration module can also be configured to start the receiving and positioning according to a time delay value pre-loaded in the mobile terminal, and after the positioning is completed, check the positioning accuracy and/or signal strength, and adjust the pre-loaded time delay value according to the positioning accuracy and/or signal strength, and start up the receiving and positioning again, check the positioning accuracy and/or signal strength, until the difference between the positioning accuracy and/or signal strength and the target value is within a predetermined range.

Preferably, the Doppler shift calibration module can be configured to detect the current clock frequency shift of the GPS receiver of the mobile terminal with a hardware clock frequency shift detector, and according to the detected clock frequency shift, correspondingly modify the clock frequency shift of the mobile terminal.

Preferably, the carrier to noise ratio calibration module is configured to calculate the difference between the first noise value obtained from the signal strength of the GPS receiver of the mobile terminal acquired by the GPS signal feedback and collection module after the baseband processing of the mobile terminal and the second noise value acquired from signal strength of the GPS receiver of the mobile terminal going through the GPS filter and the amplification module (and preferably, obtain the mean values of the first noise value and the second noise value acquired through the multi-access acquisition, and then calculate the difference of the mean values), and compare the difference with the pre-loaded value, if the difference between the difference and the pre-loaded value is larger than a first threshold value, increase the system loss value of the mobile terminal, and if the difference between the difference and the pre-loaded value is less than a second threshold value, decrease the system loss value of the mobile terminal.

Since the state parameters and/or environmental parameters of the mobile terminal will affect the GPS parameters, for example, the GPS has poor coverage in some regions, and has a problem in synchronizing with the local operator's base station, thus there may be some difference. Alternatively, the environments in which the mobile terminal is used may be different, for example, the difference in outdoor temperature in winter in the same region also affects the multipath fading calculation model. In a preferred embodiment, the data collected by the GPS signal feedback and collection module 12 can be adjusted according to the state parameters and/or environmental parameters of the mobile terminal, and the GPS parameter calibration module 12 calibrates the GPS parameters according to the adjusted data, and this function may be implemented by the control module.

In another case, if the mobile terminal is operating in a large geographical span (for example, from the Americas to Europe, or move from Shanghai to Shenzhen), then it is possible that the first positioning takes a very long time, in this case the latitude and longitude calibration module can be used, and the latitude and longitude pre-loaded in the module may be the current network information detected by the mobile terminal or the received and input latitude and longitude.

Preferably, the state parameters of the mobile terminal and/or the environmental parameters of the mobile terminal can be obtained with different methods, for example, the mobile terminal may comprise: an application detection module, which is configured to detect the state parameters of the mobile terminal and/or the environmental parameters of the mobile terminal, and send the parameters to the GPS parameter calibration module; for another example, the terminal may comprise: a user interaction module, which is configured to receive the input state parameters of the mobile terminal and/or the input environmental parameters of the mobile terminal, and send the parameters to the GPS parameter calibration module. During the implementation, if the user input method is used, it needs the involvement of the user, but does not require additional hardware; however, if the mobile terminal self-detection method is used, it does not require the involvement of the user, which can improve the user experience, but results in additional costs.

Figure 2:
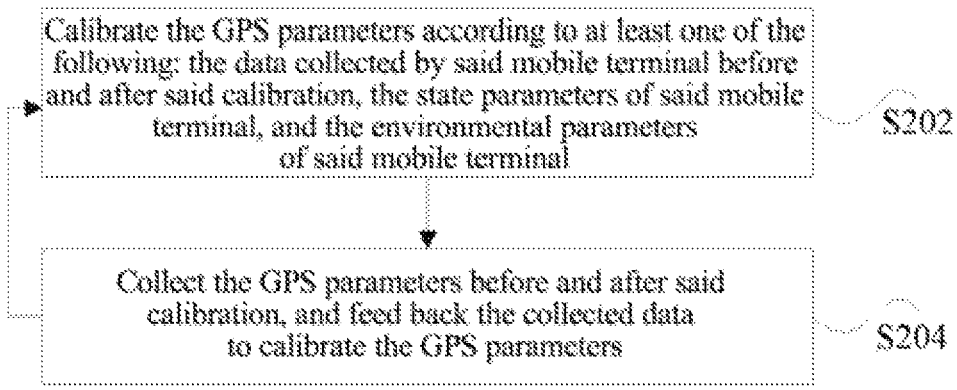
FIG. 2 is a flow chart of a GPS parameter calibration method in accordance with an embodiment of the invention.

The present embodiment also provides a GPS parameter calibration method. FIG. 2 is a flow chart of the GPS parameter calibration method according to an embodiment of the invention, and the GPS parameter calibration method can be applied to a mobile terminal. As shown in FIG. 2, the method comprises the following steps:

in step S202, the GPS parameters are calibrated according to at least one of the following: the data collected by the mobile terminal before and after the calibration, the state parameters of the mobile terminal, and the environmental parameters of the mobile terminal;

in step S204, the GPS parameters before and after the calibration are collected, and the collected data are fed back so as to implement the GPS parameter calibration in step S202.

Preferably, in step S202, the GPS parameter calibration comprises at least one of the following: calibrating the time delay parameters of the GPS; calibrating the Doppler frequency parameters of the GPS; calculating and compensating for the system losses of the GPS; and calibrating the pre-loaded latitude and longitude.

For example, the calibrating the GPS time delay parameters can be implemented with the following method: calculating the difference between the time for capturing SVs for a predetermined number of times and the required network search time, and compare the difference and the target time difference, and in the case that the difference is less than the target time difference, increase the time delay value, and in the case that the difference is larger than the target time difference, decrease the time delay value; alternatively, start up the receiving and positioning according to the time delay value pre-loaded by the mobile terminal, and after the positioning is completed, check the positioning accuracy and/or signal strength, and adjust the pre-loaded time delay value according to the positioning accuracy and/or the signal strength, and start up the receiving and positioning again, check the positioning accuracy and/or the signal strength, until the difference between the positioning accuracy and/or the signal strength and the target value is within a predetermined range.

Preferably, the calibrating the GPS Doppler frequency parameters can be implemented with the following method: detecting the current clock frequency shift of the GPS receiver of the mobile terminal through a hardware clock frequency shift detector, and correspondingly modifying the clock frequency shift of the mobile terminal based on the detected clock frequency shift.

Preferably, the calculating and compensating for the system losses of the GPS can be implemented with the following method: calculating the difference between the first noise value obtained from the signal strength of the GPS receiver of the mobile terminal acquired by the GPS signal feedback and collection module after baseband processing of the mobile terminal and the second noise value acquired from signal strength of the GPS receiver of the mobile terminal going through the GPS filter and the amplification module (and preferably, acquire the mean values of the first noise value and the second noise value acquired through the multi-access acquisition, and then calculate the difference of the mean values), and compare the difference with the pre-loaded value, if the difference between the difference and the pre-loaded value is larger than the first threshold value, increase the system loss value of the mobile terminal, and if the difference between the difference and the preloaded value is less than the second threshold value, decrease the system loss value of the mobile terminal.

Preferably, the calibrating the GPS parameters comprises: according to the state parameters of the mobile terminal and/or the environmental parameters of the mobile terminal, adjusting the data collected by the mobile terminal before and after the calibration, and calibrating the GPS parameters according to the adjusted data.

In the following, description will be made with reference to the GPS adaptive calibration device in the mobile phone.

Figure 3:
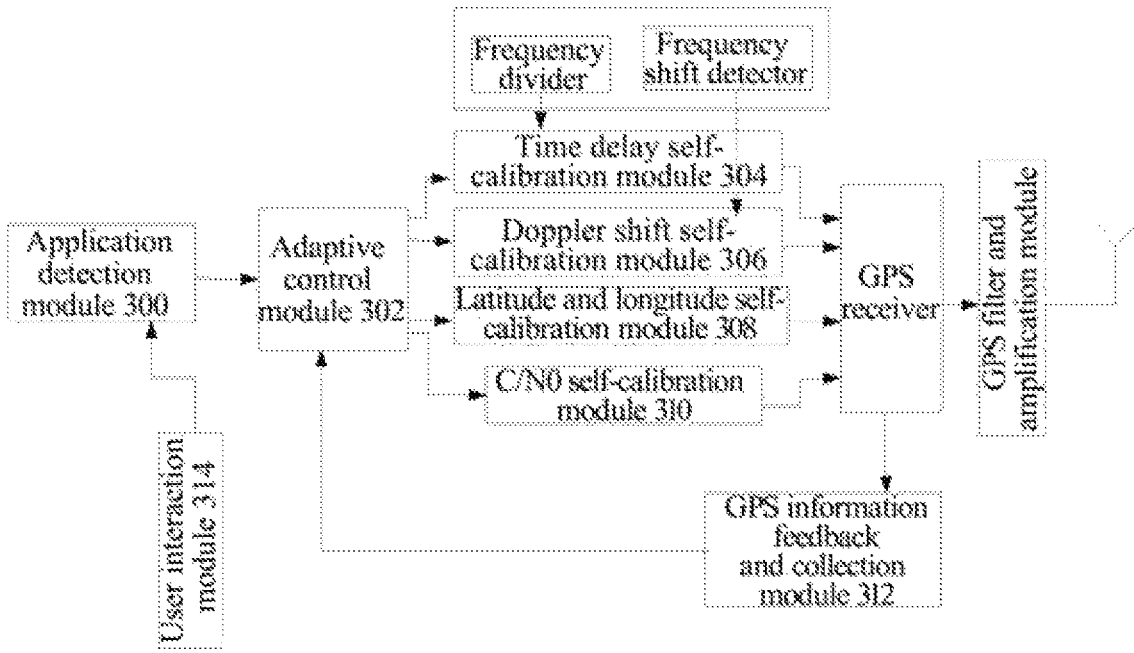
FIG. 3 is a structural diagram of a GPS adaptive calibration device in accordance with a preferred embodiment of the invention.

The present preferred embodiment provides an intelligent, convenient, and fast GPS adaptive calibration device. The GPS adaptive calibration device is located in the mobile phone to ensure that the phone can achieve different parameter calibrations in a variety of applications, communication status, and individual needs, so that the mobile GPS is always in the optimal working condition. FIG. 3 is a block diagram of the structure of the GPS adaptive calibration device in accordance with the preferred embodiment of the invention. As shown in FIG. 3, the device comprises an application detection module 300, an adaptive control module 302 (to achieve the functions of the above-mentioned control module), a time delay self-calibration module 304 (to achieve the functions of the above-mentioned time delay calibration module), a Doppler shift self-calibration module 306 (to achieve the functions of the above-mentioned Doppler calibration module), a latitude and longitude calibration module 308 (to achieve the functions of the above-mentioned latitude and longitude calibration module), a C/N0 self-calibration module 310 (to achieve the functions of the above-mentioned carrier to noise ratio calibration module), a GPS signal feedback and collection module 312 and a user interaction module 314. Wherein, the application detection module 300 is connected with each RF communication module and is configured to detect the current communication mode of the mobile terminal, frequency band and the state of user needs in real time. The adaptive control module is controlled to output the parameter-adjusted signal through detecting state. The adaptive control module 302 is connected with the application detection module 300, and is configured to perform different calibrated parameter adjustments and response controls for different states. The time delay self-calibration module 304 is connected with the adaptive control module 302 and is configured to adjust the real-time time delay parameter of the GPS. The Doppler shift self-calibration module 306 is connected with the adaptive control module 302 and is configured to adjust the real-time Doppler frequency parameter of the GPS. The latitude and longitude calibration module 308 is connected with the adaptive control module and is configured to adjust the real-time latitude and longitude preloaded in the GPS. The C/N0 self-calibration module 310 is connected with the adaptive control module 302 and is configured to calculate and compensate for the system losses of the GPS. The GPS signal feedback and collection module 312 is connected with the above-mentioned three modules and the GPS receiver module, and real-time acquires the carrier to noise ratio and the sensitivity information of the GPS before and after the adjustment. The user interaction module 314 is connected with the application detection module 300 and is configured to perform interactive selection for applications such as different modes, frequency band needs, workplaces or environmental requirements, and the mobile phones can perform parameter adjustments according to different requirements.

With the above-mentioned modules, the mobile terminal can implement the GPS self-calibration more intelligently, conveniently and rapidly in the aspect of a combination of hardware and software, combining with the phone's internal structure and functions, and fully considering a variety of application environments and user experiences of the GPS of the mobile phone, and thus allowing the phone's GPS adjustment to evolve to the direction of intelligence.

Figure 4:
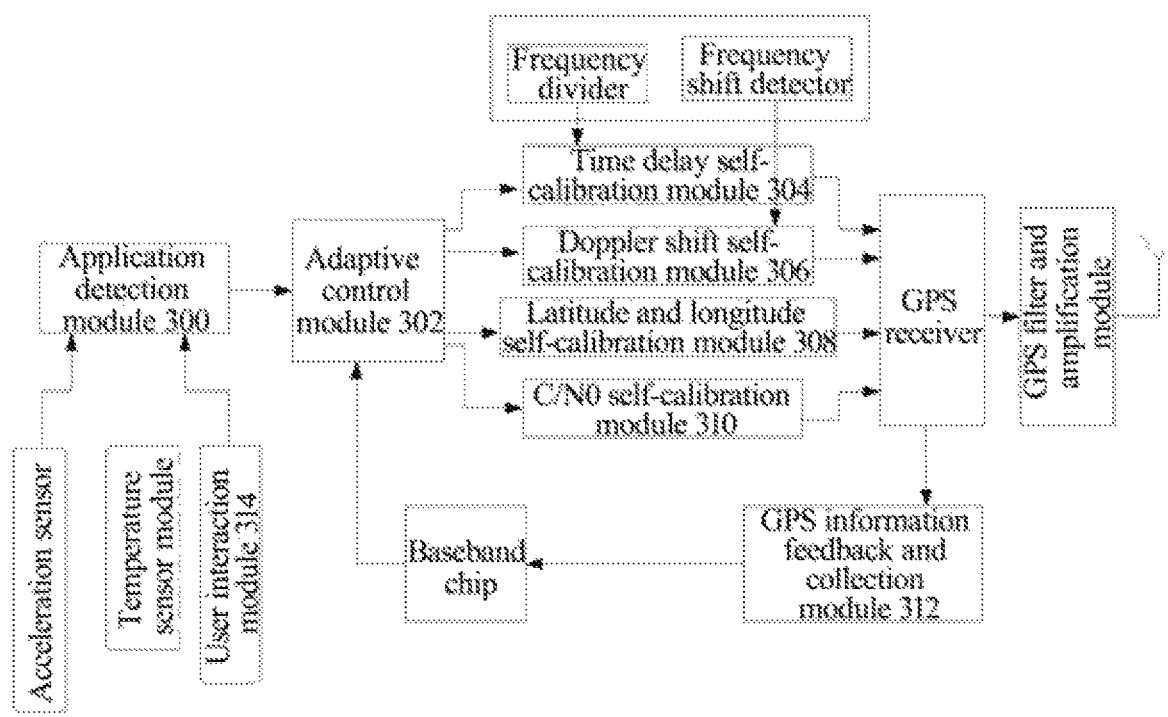
FIG. 4 is a structural diagram of a GPS adaptive calibration device used in a mobile phone in accordance with a preferred embodiment of the invention.

FIG. 4 is a structural diagram of the GPS adaptive calibration device applied in the mobile phone according to a preferred embodiment of the invention. As shown in FIG. 4, the mobile terminal comprises the above-mentioned application detection module 300, the adaptive control module 302, the time delay self-calibration module 304, the Doppler shift self-calibration module 306, the latitude and longitude self-calibration module 308, the C/N0 self-calibration module 310, the GPS signal feedback and collection module 312, the user interaction module 314, and also comprises an acceleration sensor, a temperature sensor module, as well as the baseband chip module, a GPS receiver module, a GPS filter and amplification module, and a GPS antenna unit in the mobile phone. In the following, it will be described with reference to FIG. 3 and FIG. 4.

The application detection module 300 is connected with the acceleration sensor, the temperature sensor module and the user interaction module, and is configured to monitor the current state of the phone and the state of user needs in real time. It is achieved through a multi-path selective switch, and the input signal is the output enable signal of each sensor, and the output signal is the adaptive control enable signal. For example, if the phone is currently in a good climate, the application detection module 300 detects that the input signal is an effective high-level signal S1, and if the climate is bad, the signal is an effective low-level signal S0; if the phone is currently superheat, it is displayed as high-level signal, and when the phone's temperature is relatively low, the signal is low level, when the phone temperature is in the normal range, the signal is high-impedance signal; when the phone moves at high speed, the signal is high level, and when the phone is still or moves at low speed, the signal is low level; the mobile phone sends a control signal to the adaptive control module 302 via pulse blink detection and makes real-time calibration parameter adjustment.

The adaptive control module 302 is connected with the application detection module 300 and the respective calibration modules, and is configured to make different parameter adjustments and response controls for different states of the phones. The control terminal of the module is the output signal of the application detection module, and the output of the module is the input adjustment signal of the parameter adjustable module or the memory NV value that is to be written in, and the amplitude of the adjustment signal is obtained through the calculation and comparison according to the feedback value, there is a corresponding table of a set of amplitude numbers contained in the adaptive control module, and control parameter values are output, and the adaptive amplitude signal is output and adjusted according to the feedback results, until the final and full calibration is complete.

The time delay self-calibration module 304 is connected with the adaptive control module 302, and is configured to adjust the time delay parameters of the GPS in real time. For example, the system first detects the current network mode, and clears the item of NV corresponding to the preset basic time delay value to zero, and the mobile phone starts up a clock divider, and divides the basic clock signal for N times to obtain a minimum acquisition signal clock. The module enables a particular satellite signal acquisition functionality, and the precise clock starts to count the time, and calculates the difference between the time of capturing 100 times of SV and the required network search time, and then compare the difference with the target time difference, and when the test time difference is less than the target time difference, it indicates that the time delay value should be increased, and the NV value increases accordingly; when the test time difference is larger than the target time difference, it indicates that the time delay value should be decreased, and the NV value decreases correspondingly. For another example, the time delay self-calibration module 304 can also detect the current positioning accuracy and carrier to noise ratio through the closed loop, and the positioning accuracy and the carrier to noise ratio can indirectly reflect whether it currently needs to perform the time delay correction or not. If the mobile phone is pre-loaded with a predetermined time delay value, the receiving and positioning is started up, and after the positioning is completed, the positioning accuracy and signal strength are checked. If the positioning accuracy is poor and is larger than the assumed target value, 6 meters, meanwhile, the carrier to noise ratio is very small and is less than the mean value, 38 dB-Hz, it indicates that the time delay may be poor, and it is adjusted to larger or smaller by fine-adjusting the corresponding time delay value per unit (for example, it is originally 9600 NS), and the corresponding effect value is re-detected until it approximates to the target value.

The Doppler shift self-calibration module 306 is connected with the adaptive control module 302 and is configured to adjust the Doppler frequency parameters of the GPS in real time. In the GPS receiver, at the stage of capturing the GPS signal, in fact, it needs to search for all possible frequencies and code delay spaces, while the frequency shift caused by the Doppler effect causes the number of frequency ranges that should be searched by the GPS receiver to be far more than one, and the entire Doppler shift range has to be searched, which results in a very long time for the boot of a traditional GPS receiver, meanwhile, it also causes error in the positioning accuracy.

After booting this module, the system pre-loads the preset Doppler frequency delay value, for example, the current value is 9 HZ, and then through the closed loop, detects the current positioning accuracy and the sensitivity value, completes the variable-range adjustment, and locks the Doppler shift in a certain range. Meanwhile, with the hardware clock frequency shift detector, the current lock frequency shift of the GPS receiver is detected, and correspondingly the clock frequency shift is modified. If the current frequency shift is 2 HZ, the Doppler calibration value should be modified to 7 HZ, and if the current frequency shift is −4 HZ, the Doppler calibration value should be modified to 5 HZ. In the test for the above-mentioned calibration value, the mean value should be obtained by performing several tests for each high, medium and low signal, meanwhile, it also needs to detect the signal input values in each moving state when the phone is at high speed, low speeds and stays still, and finally permutes the calibrated frequency shift into the corresponding NV value, and the corresponding item of NV written into the phone becomes into effect.

The latitude and longitude calibration module 308 is connected with the adaptive control module 302 and is configured to adjust the preloaded latitude and longitude of the GPS in real time. For example, when the phone moves from point A to point B, which has a great span of longitude and latitude, the GPS receiver often cannot quickly locate in a short time because of the large changes of the ephemeris and almanac. Especially for those terminals that do not have the A-GPS base station assisted positioning system, or the regions in which there is error between the ephemeris stored in the GPS system and that stored in the local station, the latitude and longitude calibration module can be automatically booted, and the pre-loaded latitude and longitude can be adjusted in real time. By detecting the information of the current mobile network or setting the user's customized area, the mobile phone extracts a certain built-in latitude and longitude location parameter, and after the application detection module detects the trigger instruction, the adaptive control module controls and adjusts the latitude and longitude calibration module, and corrects it to specified parameter information, and re-acquires the current signal strength and the number of satellites using the GPS signal feedback and collection module, decides whether the current latitude and longitude parameter is reasonable or not, thus feeding back and changing the adjustment until the signal is strongest.

The C/N0 self-calibration module 310 is connected with the adaptive control module 302, and calculates the difference between the C/N0 value of the baseband of the feedback and acquisition system and the system input signal value, and is configured to calculate and compensate for the system losses of the GPS. For example, the signal strength acquired at the RF entrance of the GPS is input to the baseband processing module, subtracted by the current thermal noise density to obtain the corresponding CN01, and the average difference between CN01 and CN02 value, wherein the CN02 value is acquired after the GPS filter and the amplification module, obtained through several measurements is compared with a pre-loaded CN0 LOSS value, if it is too large, the system loss value is increased, and if it is too small, the system loss value is decreased; and finally, it is converted to the NV value corresponding to the GPS_RF_LOSS and written into the corresponding item.

The GPS signal feedback and collection module 312 is connected with the above-mentioned three modules and the GPS receiver module, and collects the GPS parameters, such as the carrier to noise ratio, the number of satellites and the positioning accuracy, before and after the adjustment in real time.

The user interaction module 314 is connected with the application detection module 300 and is configured to perform interactive selections for the users according to applications such as different band requirements, and regional or environmental temperature requirements, and the mobile phone completes the calibration parameter adjustment according to different needs.

The baseband chip module is connected with the adaptive control module 302 and is configured to detect the phone's current signal amplitude CN0. The CN0 can check the current signal strength of the GPS of the mobile phone, and the baseband chip decides the quality of the receiving link and whether it needs to increase the broadcast transmission intensity or not, and according to the strength of the signal amplitude, self-calibrate the phone matching, and the calibration result is impedance adjusted and controlled through the adaptive control module.

Figure 5:
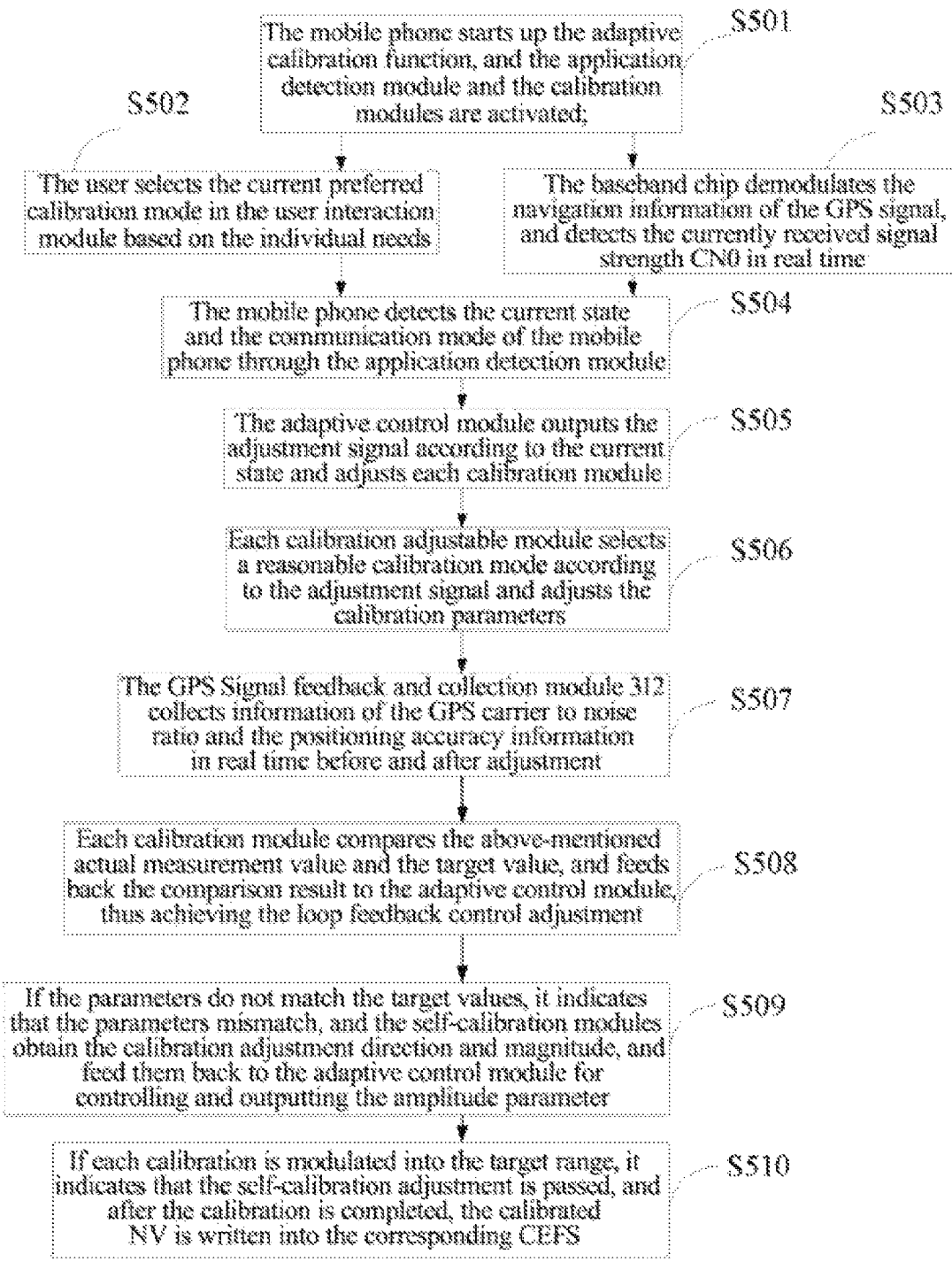
FIG. 5 is a flow chart of the operation of an adaptive GPS calibration module in accordance with a preferred embodiment of the invention.

FIG. 5 is a flow chart of the operation of the adaptive GPS calibration module in accordance with the preferred embodiment of the invention. As shown in FIG. 5, the process comprises the following steps:

in step S501: the mobile phone starts up the adaptive calibration function, and the application detection module 300 and each calibration module are activated;

in step S502: the user selects the current preferred calibration mode in the user interaction module 314 based on the individual needs, and calibrates and compares the subsequent calibration models according to the calibration mode;

step S503: the baseband chip demodulates the navigation information of the GPS signal, and detect the currently received signal strength CN0 in real time;

step S504: the mobile phone detects the current state and the communication mode of the mobile phone through the application detection module 300;

step S505: the adaptive control module outputs the adjustment signal according to the current state and adjusts each calibration module;

step S506: each calibration adjustable module selects a reasonable calibration mode according to the adjustment signal and adjusts the calibration parameters;

step S507: the GPS signal feedback and collection module 312 collects the GPS parameters, such as information of the carrier to noise ratio and the positioning accuracy, in real time before and after the adjustment;

step S508: each calibration module compares the above-mentioned actual measurement value and the target value, and feeds back the comparison result to the adaptive control module, thus achieving the loop feedback control adjustment;

step S509: if the parameters do not match the target values, it indicates that the parameters mismatch, and each self-calibration module obtains the calibration adjustment direction and magnitude based on the empirical model parameters, and feeds them back to the adaptive control module for controlling and outputting the amplitude parameters;

step S510: if each calibration is modulated into the target range, the positioning accuracy obtained by the sampling module is relatively high, and the CN0 value is relatively large, and the first positioning takes a relatively short time, indicating that the self-calibration adjustment is passed, and one cycle of adjustment is completed, and after the calibration is completed, the calibrated NV is written into the corresponding RF configuration file.

Different from the simple and fixed GPS calibration parameters, the above-mentioned preferred embodiments fully consider difference matching of different application states of the phone, so that the GPS receiver performance of the mobile phone achieves its optimum. Furthermore, the above-mentioned embodiments are not limited to a simple combination and conversion of multiple calibration modes, but achieve dynamical adjustment on the basis of optimum algorithm design, so that GPS parameters achieve organic matching. Furthermore, the phone's internal circuitry and structure are fully used, the self-detection technology and adaptive calibration design are used, and the adjustment method is scientific and rational, and intelligent and practical. At the same time, the entire adjustment process is not dependent on the A-GPS base station network, or large-scale and complex algorithms, but is implemented with a simple, feasible, and adaptive method. The above-mentioned preferred embodiments fully consider the application state of the mobile phone, and with combination of the user's requirements on performance and use conditions, adjust the GPS calibrated NV to the optimal state, which is safe and reliable.

Obviously, the person of ordinary skill in the art should understand that each module or step in the above-mentioned embodiments can be implemented with general-purpose computation devices, and the modules and steps can be integrated on a single computation device, or distributed across a network consisting of a plurality of computation devices; optionally, they can be implemented with executable program codes in the computation devices, therefore, they can be stored in storage devices and implemented by the computation devices, or the executable program codes can be made into individual integrated circuit modules, or some of the modules or steps are made into a single integrated circuit module to be implemented. Therefore, the invention is not limited to any particular hardware and software combination.

The above description is only the preferred embodiments of the invention and is not intended to limit the invention. For those skilled in the art, the invention may have various modifications and variations. Within the spirit and principles of the invention, any modification, equivalent replacement, and improvement should be included in the protection scope of the invention.

What is claimed is:

1. A mobile terminal, comprising:
a GPS receiver;
a frequency divider;
a processor;
a memory;
a Global Positioning System (GPS) parameter calibration module, which is configured, with the processor, to calibrate GPS parameters according to at least one of the following items: data from a GPS signal feedback and collection module, state parameters of said mobile terminal, environmental parameters of said mobile terminal;
said GPS signal feedback and collection module, which receives output of the GPS receiver, and is configured, with the processor, to collect GPS parameters before and after said GPS parameter calibration module performs the calibration, and feedback collected data to said GPS parameter calibration module;
wherein said GPS parameter calibration module comprises a time delay calibration module, which is configured, with the processor, to calibrate time delay parameters of the GPS;
wherein said time delay calibration module receives output of the frequency divider, and is configured, with the processor, to:
calculate a difference between the time of capturing satellite vehicles (referred to as SV) for a preset number of times and the required network search time, and compare said difference with a target time difference, in the case that said difference is less than said target time difference, increase a time delay value, and in the case that said difference is greater than said target time difference, decrease the time delay value; alternatively,
according to a time delay value pre-loaded by said mobile terminal, start up receiving and positioning, and after the positioning is completed, check a positioning accuracy and/or signal strength, and adjust said pre-loaded time delay value according to said positioning accuracy and/or said signal strength, and start up receiving and positioning again, check said positioning accuracy and/or said signal strength, until a difference between said positioning accuracy and/or said signal strength and a target value is within a predetermined range.

2. The mobile terminal according to claim 1, wherein, said GPS parameter calibration module further comprises at least one of the following:
a time delay calibration module, which is configured to calibrate time delay parameters of a GPS;
a Doppler shift calibration module, which is configured, with the processor, to calibrate Doppler frequency parameters of said GPS;
a carrier to noise ratio calibration module, which is configured, with the processor, to calculate and compensate for system losses of said GPS;
a latitude and longitude calibration module, which is configured, with the processor, to calibrate pre-loaded latitude and longitude.

3. The mobile terminal according to claim 2, wherein, said latitude and longitude calibration module is configured, with the processor, to receive information of a current network detected by said mobile terminal or receive input latitude and longitude to acquire said pre-loaded latitude and longitude.

4. The mobile terminal according to claim 3, wherein, the mobile terminal further comprises: a control module, which is configured, with the processor, to, according to said state parameters of said mobile terminal and/or said environmental parameters of said mobile terminal, adjust said data from said GPS signal feedback and collection module;
said GPS parameter calibration module is configured, with the processor, to calibrate said GPS parameters according to said data adjusted by said control module.

5. The mobile terminal according to claim 2, wherein,
said mobile terminal further comprises a hardware clock frequency shift detector; and
said Doppler shift calibration module is configured, with the processor, to detect a current clock frequency shift of a said GPS receiver of said mobile terminal with a through said hardware clock frequency shift detector, and based on said detected clock frequency shift, correspondingly correct said clock frequency shift of said mobile terminal.

6. The mobile terminal according to claim 5, wherein, the mobile terminal further comprises: a control module, which is configured, with the processor, to, according to said state parameters of said mobile terminal and/or said environmental parameters of said mobile terminal, adjust said data from said GPS signal feedback and collection module;
said GPS parameter calibration module is configured, with the processor, to calibrate said GPS parameters according to said data adjusted by said control module.

7. The mobile terminal according to claim 2, wherein, said mobile terminal further comprises a baseband chip and a GPS filter and amplification module; and
said carrier to noise ratio calibration module is configured, with the processor, to calculate a difference between a first noise value obtained from the signal strength of said GPS receiver of said mobile terminal acquired by said GPS signal feedback and collection module after and baseband processing processed by said baseband chip of said mobile terminal and a second noise value acquired from the signal strength of said GPS receiver of said mobile terminal going through a said GPS filter and an amplification module, and compare said difference with a pre-loaded value, and if a difference between said difference and said pre-loaded value is greater than a first threshold value, increase a system loss value of said mobile terminal, and if a difference between said difference and said pre-loaded value is less than a second threshold value, decrease said system loss value of said mobile terminal.

8. The mobile terminal according to claim 7, wherein, the mobile terminal further comprises: a control module, which is configured, with the processor, to, according to said state parameters of said mobile terminal and/or said environmental parameters of said mobile terminal, adjust said data from said GPS signal feedback and collection module;
said GPS parameter calibration module is configured, with the processor, to calibrate said GPS parameters according to said data adjusted by said control module.

9. The mobile terminal according to claim 2, wherein, the mobile terminal further comprises: a control module, which is configured, with the processor, to, according to said state parameters of said mobile terminal and/or said environmental parameters of said mobile terminal, adjust said data from said GPS signal feedback and collection module;

said GPS parameter calibration module is configured, with the processor, to calibrate said GPS parameters according to said data adjusted by said control module.

10. The mobile terminal according to claim 2, further comprising:
an application detection module, which is implemented by a multi-path selective switch, and is configured, with the processor, to detect said state parameters of said mobile terminal and/or said environmental parameters of said mobile terminal, and send said parameters to said GPS parameter calibration module; and/or,
a user interaction module, which is configured, with the processor, to receive input state parameters of said mobile terminal and/or input environmental parameters of said mobile terminal, and send these parameters to said GPS parameter calibration module.

11. The mobile terminal according to claim 2, wherein, said state parameters of said mobile terminal comprise at least one of the following: current communication mode of said mobile terminal, acceleration of said mobile terminal;
said environmental parameters of said mobile terminal comprise at least one of the following: environmental temperature of said mobile terminal, and latitude and longitude of a region in which the mobile terminal is located.

12. The mobile terminal according to claim 1, wherein, the mobile terminal further comprises: a control module, which is configured, with the processor, to, according to said state parameters of said mobile terminal and/or said environmental parameters of said mobile terminal, adjust said data from said GPS signal feedback and collection module;
said GPS parameter calibration module is configured, with the processor, to calibrate said GPS parameters according to said data adjusted by said control module.

13. The mobile terminal according to claim 1, further comprising:
an application detection module, which is implemented by a multi-path selective switch, and is configured, with the processor, to detect said state parameters of said mobile terminal and/or said environmental parameters of said mobile terminal, and send said parameters to said GPS parameter calibration module; and/or,
a user interaction module, which is configured, with the processor, to receive input state parameters of said mobile terminal and/or input environmental parameters of said mobile terminal, and send these parameters to said GPS parameter calibration module.

14. The mobile terminal according to claim 1, wherein, said state parameters of said mobile terminal comprise at least one of the following: current communication mode of said mobile terminal, acceleration of said mobile terminal;
said environmental parameters of said mobile terminal comprise at least one of the following: environmental temperature of said mobile terminal, and latitude and longitude of a region in which the mobile terminal is located.

15. The mobile terminal according to claim 1, wherein, the mobile terminal further comprises: a control module, which is configured, with the processor, to, according to said state parameters of said mobile terminal and/or said environmental parameters of said mobile terminal, adjust said data from said GPS signal feedback and collection module;
said GPS parameter calibration module is configured, with the processor, to calibrate said GPS parameters according to said data adjusted by said control module.

16. A parameter calibration method for a global positioning system, used in performed by a mobile terminal comprising a GPS receiver and a frequency divider, a processor and a memory, comprising:
calibrating Global Positioning System (GPS) parameters based on at least one of the following items: data collected by said mobile terminal before and after said calibrating, state parameters of said mobile terminal, environmental parameters of said mobile terminal;
receiving output of the GPS receiver and collecting GPS parameters before and after said calibrating, feeding back said collected data, to perform calibration of said GPS parameters;
wherein calibrating said GPS parameters comprises calibrating time delay parameters of the GPS;
wherein calibrating time delay parameters of the GPS comprises receiving output of the frequency divider, and
calculating a difference between the time of capturing satellite vehicles (referred to as SV) for a preset number of times and the required network search time, and comparing said difference with a target time difference, in the case that said difference is less than said target time difference, increasing a time delay value, and in the case that said difference is greater than said target time difference, decreasing the time delay value; alternatively,
according to a time delay value pre-loaded by said mobile terminal, starting up receiving and positioning, and after the positioning is completed, checking a positioning accuracy and/or signal strength, and adjusting said pre-loaded time delay value according to said positioning accuracy and/or said signal strength, and starting up receiving and positioning again, checking said positioning accuracy and/or said signal strength, until a difference between said positioning accuracy and/or said signal strength and a target value is within a predetermined range.

17. The method according to claim 16, wherein, calibrating said GPS parameters further comprises at least one of the following:
calibrating time delay parameters of said GPS;
calibrating Doppler frequency parameters of said GPS;
calculating and compensating for system losses of said GPS; and
calibrating pre-loaded latitude and longitude.

18. The method according to claim 17, wherein, calibrating said GPS parameters comprises:
adjusting said data collected by said mobile terminal before and after said calibrating according to said state parameters and/or said environmental parameters of said mobile terminal, and calibrating said GPS parameters according to the adjusted data.

19. The method according to claim 16, wherein, calibrating said GPS parameters comprises:
adjusting said data collected by said mobile terminal before and after said calibrating according to said state parameters and/or said environmental parameters of said mobile terminal, and calibrating said GPS parameters according to the adjusted data.

* * * * *